United States Patent
McArdle et al.

(10) Patent No.: US 11,939,493 B2
(45) Date of Patent: Mar. 26, 2024

(54) TWO-PART CURABLE COMPOSITION

(71) Applicant: BOSTIK SA, Colombes (FR)

(72) Inventors: Ciaran McArdle, Barcelona (ES); Arnau Pejoan Jimenez, Barcelona (ES); Patxi Garra, Barcelona (ES); Vladimir Tchaplinski, Barcelona (ES); Marta Rodriguez Ble, Barcelona (ES); Jordi Solera Sendra, Barcelona (ES); Maria Campanyá I Llovet, Barcelona (ES)

(73) Assignee: BOSTIK SA, Colombes (FR)

( * ) Notice: Subject to any disclaimer, the term of this patent is extended or adjusted under 35 U.S.C. 154(b) by 380 days.

(21) Appl. No.: 17/439,443

(22) PCT Filed: Mar. 18, 2020

(86) PCT No.: PCT/EP2020/057385
§ 371 (c)(1),
(2) Date: Sep. 15, 2021

(87) PCT Pub. No.: WO2020/187964
PCT Pub. Date: Sep. 24, 2020

(65) Prior Publication Data
US 2022/0177747 A1    Jun. 9, 2022

(30) Foreign Application Priority Data
Mar. 19, 2019  (EP) ..................................... 19305335

(51) Int. Cl.
| | | |
|---|---|---|
| C09J 135/04 | (2006.01) | |
| C08F 220/28 | (2006.01) | |
| C08F 222/32 | (2006.01) | |
| C08K 13/02 | (2006.01) | |
| C09J 4/00 | (2006.01) | |

(52) U.S. Cl.
CPC ......... *C09J 135/04* (2013.01); *C08F 220/281* (2020.02); *C08F 222/327* (2020.02); *C08K 13/02* (2013.01); *C09J 4/00* (2013.01)

(58) Field of Classification Search
None
See application file for complete search history.

(56) References Cited

U.S. PATENT DOCUMENTS

| | | |
|---|---|---|
| 2,467,927 A | 4/1949 | Ardis et al. |
| 3,260,637 A | 7/1966 | Von |
| 3,825,580 A | 7/1974 | Kato et al. |
| 3,836,377 A | 9/1974 | Delahunty |
| 4,460,758 A | 7/1984 | Peiffer et al. |
| 5,066,743 A | 11/1991 | Okamoto et al. |
| 5,110,392 A | 5/1992 | Ito et al. |
| 5,350,875 A | 9/1994 | Kumar et al. |
| 5,430,177 A | 7/1995 | Sabahi et al. |
| 6,001,213 A | 12/1999 | Liu |
| 6,706,414 B1 | 3/2004 | Dammann et al. |
| 7,932,305 B2 | 4/2011 | Badejo et al. |
| 8,481,755 B2 | 7/2013 | McArdle et al. |
| 2003/0134973 A1 | 7/2003 | Chen et al. |
| 2003/0191248 A1 | 10/2003 | Ryan et al. |
| 2005/0000646 A1 | 1/2005 | Ryan et al. |
| 2005/0179421 A1 | 9/2005 | Loomis |
| 2014/0329959 A1* | 11/2014 | Barnes ................ C09J 4/06 525/289 |

FOREIGN PATENT DOCUMENTS

| | | |
|---|---|---|
| CN | 104520396 A | 4/2015 |
| CN | 109476874 A | 3/2019 |
| EP | 0659859 A1 | 6/1995 |
| EP | 0970137 A1 | 1/2000 |
| JP | 56095966 A * | 8/1981 |
| WO | 9807801 A1 | 2/1998 |
| WO | 9841561 A1 | 9/1998 |
| WO | 2005012394 A2 | 2/2005 |
| WO | 2012035112 A1 | 3/2012 |
| WO | 2012082348 A1 | 6/2012 |
| WO | 2013111036 A1 | 8/2013 |
| WO | 2017202698 A1 | 11/2017 |

OTHER PUBLICATIONS

JP55695966 English Machine Translation, prepared Nov. 16, 2023 (Year: 2023).*
ISA/EP; International Search Report and Written Opinion for International Patent Application No. PCT/EP2020/057385 dated Apr. 20, 2020, 12 pages.

* cited by examiner

*Primary Examiner* — Christopher M Rodd
(74) *Attorney, Agent, or Firm* — NK Patent Law

(57) ABSTRACT

The present invention concerns a two-part curable composition comprising: •a first part (component A) comprising: —at least 51% by weight based on the total weight of the first part, of one or more cyanoacrylate monomer(s); —a transition metal complex; and —an antioxidant; •a second part (component B) comprising: —a per-compound; —at least one Michael acceptor M selected from the group consisting of (meth)acrylic monomers, (meth)acrylic functionalized oligomers, (meth)acrylic functionalized resins, and mixtures thereof; provided that the composition comprises (in the first part and/or in the second part) at least one compound C comprising a radical -$EWG_1$-$CH_2$-$EWG_2$- wherein $EWG_2$ and $EWG_1$ are independently of each other an electron withdrawing group.

19 Claims, No Drawings

TWO-PART CURABLE COMPOSITION

CROSS-REFERENCE TO RELATED APPLICATIONS

This application is a U.S. National Stage application of International Patent Application No. PCT/EP2020/057385, filed on Mar. 18, 2020, which claims the benefit of European Patent Application No. 19305335.2, filed on Mar. 19, 2019.

FIELD OF THE INVENTION

The present invention relates to the field of two-part curable compositions based on cyanoacrylates.

The present invention also related to the use of the two-part curable composition.

BACKGROUND ART

Adhesive compositions based on cyanoacrylate (CA) esters are well-known, e.g. as instant adhesives or so-called 'superglues'. They are popular in many areas of application and are used by consumers, professional craft workers and industrial assemblers. They are typically solvent free, 100% reactive materials, noted for their ability to form strong adhesive bonds on many different substrates rapidly and without the need of energetic stimuli, such as electromagnetic radiation or heat, to invoke adhesive cure. These attributes are very appealing from the viewpoint of sustainability and end user convenience.

The ability of conventional single-component (1K) CAs to cure, or polymerise, in the process of assembly of most substrate types partly relates to the fact that initiation of the polymerisation process occurs from nucleophilic or ionic species found, under normal circumstances, on most surfaces, e.g., absorbed water, salts, traces of basic materials, etc. When parts to be assembled from substrates such as metals, alloys, ceramics, rubbers, papers, living tissue, leathers and plastics, etc., are placed in contact with a thin layer of liquid cyanoacrylate adhesive in between, a very strong joint results when the adhesive cures solid.

Even though the breadth of substrate types that CA can bond rapidly at room temperature is far superior to any other adhesive class, certain substrates pose challenges, for example the so-called 'low surface energy' substrates, such as polyolefins and 'non-stick' fluorinated polymers. Technical solutions addressed to solve this limitation have been disclosed in the state of the art, such as, for example, U.S. Pat. Nos. 3,260,637, 3,836,377, 4,460,758, 5,818,325, 5,110,392, 5,066,743, 6,001,213, US-A-2003/0191248, or US-A-2005/0000646, wherein the use of activators prior to the subsequent application of the CA composition was proposed.

However, one impediment associated with 1K adhesives relates to the lack of so-called 'cure through volume' (CTV). This limited cure throughout the bulk adhesive in thicker bondlines arises because the most efficient cure occurs closest to the source of initiating species, which are found on the surfaces.

An alternative and more efficient approach to achieve CTV between substrates being assembled when using CA adhesives is one that avoids the dependence on the substrate surfaces only as a source of efficacious initiator. Such an approach instead relies on direct mixing of specific activators contained in a liquid or gel-like carrier into the bulk reactive CA compositions, wherein the mixture of these two separate compositions is then applied to the substrate(s). This approach can offer superior distribution of the activator into the body of the adhesive relative to activating solely from each substrate interface, when the activator is at an appropriate concentration in a compatible carrier. In this context, the admixing components into the bulk adhesive is referred to as a 'two-part', 'two-component', or '2K' approach and such approaches involving CA compositions are well known in the prior art.

When describing 2K approaches, it is common to refer to separate components or parts of the adhesive and/or its package, for example as 'Part A', and 'Part B'. Thus, if Part A contains a CA composition in one compartment or reservoir, then Part B may contain compositions selected to activate, react and/or modify physical properties (plasticize, colour, toughen, etc.) of the adhesive that results from mixing the two parts by any means.

Whereas there is clear advantage of uniformly mixing an activating component directly into a CA composition to achieve simultaneous initiation throughout the bulk of the adhesive, new challenges emerge with this approach.

Firstly, cyanoacrylate compositions are extremely reactive and only minor concentrations, typically ranging from tens to a few thousand parts per million, of activator species may be required to initiate polymerisation. Such tiny amounts must be contained in a suitable carrier to enable uniform mixing when mixed into the bulk cyanoacrylate composition.

Secondly, by purposeful activation, the time available to the end user to dispense and assemble once having 'triggered' (activated) polymerisation is obviously limited.

The two-part approach typically offers several benefits over single part adhesives, but the approach also has some disadvantages. In particular the very act of admixing an activator can create inconvenience since this starts the cure reaction and therefore limits the time the end user has to perform bonding tasks. Prior art approaches go some way to achieve balance in working times but often at the expense of other performance parameters.

As indicated for structural two-part acrylic adhesives in EP 0 659 859, a highly desirable goal would be the realisation of a reactive bulk composition which could be already activated or initiated yet achieve long working and on-part open times as well as relatively fast fixture when an end user is ready to assemble and bond parts. In the case of CA this is even more elusive because they possess the highest rates of polymerization of known commercial monomers once initiated. In fact, attributes such as long on-part open time combined with a subsequent fast fixturing time of parts are diametrically opposed most especially for CA. Notwithstanding the desire to achieve such benefits, there is a need for the same adhesive to also bond parts derived from multiple substrate types with high strength and exhibit high CTV, thermal, solvent and humidity resistance, again which are properties that are not straightforward to design into a cyanoacrylate adhesive without compromises.

Thus, there is still the need to provide new adhesive two-part compositions fast fixturing combined with extended periods of time remaining usable once activated, and at least one of the following properties: curing through depth, thermal resistance and chemical resistance.

There is more particularly a need to provide new two-part composition exhibiting thermal resistance.

DETAILED DESCRIPTION OF THE INVENTION

The present invention concerns a two-part curable composition comprising:

a first part (component A) comprising:
  at least 51% by weight based on the total weight of the first part, of one or more cyanoacrylate monomer(s);
  a transition metal complex; and
  an antioxidant;
a second part (component B) comprising:
  a per-compound;
  at least one Michael acceptor M selected from the group consisting of (meth)acrylic monomers, (meth)acrylic functionalized oligomers, (meth)acrylic functionalized resins, and mixtures thereof;
  optionally an acid scavenger AS selected from sterically hindered bases;
provided that:
  the composition comprises (in the first part and/or in the second part) at least one compound C comprising a radical -$EWG_1$-$CH_2$-$EWG_2$- wherein $EWG_2$ and $EWG_1$ are independently of each other an electron withdrawing group; and
  the first part of the composition does not comprise per-compound.

The radical (group) -$EWG_1$-$CH_2$-$EWG_2$- is typically known as an active methylene radical (group) wherein methylene group —$CH_2$— is sandwiched between two electron withdrawing groups -$EWG_1$- and -$EWG_2$- (each withdrawing electrons by resonance).

The ranges disclosed in this description include both the lower and the upper limit thereof. For example, the expressions "ranging from x to y" or "between x and y" comprises the limits x and y.

The term 'working lifetime' or 'Working Time ("WT")' used throughout the instant description refers to the period between first admixing of an activator into the cyanoacrylate composition and subsequent application of the activated composition to parts, that is the time the activated product resides or remains in the static mixing element (that is used to unite adhesive components and as a dispensing nozzle) itself, i.e., between dispensing operations. Once activator is admixed the curing process begins and continues as the adhesive is dispensed from the static mixing element.

The term 'Open Time' ('OT') refers to the time wherein already activated and subsequently dispensed adhesive remains workable, that is, not substantially cured when applied as a drop, bead, or volume on one substrate, to the extent that it cannot form an effective adhesive bond when used to unite a second substrate. Open time thus describes the period wherein the adhesive remains activated but substantially uncured and ready to usefully bond parts. An adhesive with a long OT refers to one that does not set-up prematurely before parts are assembled even after residing for a relatively long time on single parts.

The term 'Fixture time' ("FT") used in the instant description is a measure of bonding speed defined as the time taken for a bonded assembly, using a minimum quantity of adhesive (a 'small' drop) on two matching substrates to have the ability to suspend a 3 Kg weight for longer than 10 s, when the weight is hung on one end of the bonded assembly in a vertical orientation.

Component A

Cyanoacrylate Monomer(s)

In a preferred embodiment, cyanoacrylate monomer has the general formula (I):

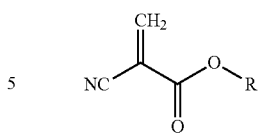

(I)

wherein R is selected from the group consisting of $C_1$-$C_{18}$ linear or branched alkyl, $C_3$-$C_{20}$ alkoxyalkyl, trimethylsilylated $C_1$-$C_3$ alkyl, furfuryl, allyl, cyclohexyl, and a group having the following formula: —$R^i$—O—C(O)—C($R^j$)=$CH_2$ with $R^i$ being an organic moiety (preferably alkylene group), and $R^j$ being H or $CH_3$. In formula (I), R represents preferably a $C_1$-$C_{18}$ linear or branched alkyl or a $C_3$-$C_{20}$ alkoxyalkyl.

In one embodiment, cyanoacrylate monomers having the formula (I) above are those wherein R has the general formula (II):

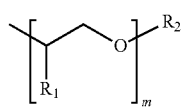

(II)

wherein $R_1$=$CH_3$ or H, $R_2$=$C_1$-$C_4$ linear or branched alkyl, and m ranges from 1 to 3.

The cyanoacrylate monomer(s) may be chosen from the group consisting of 2-methoxyethyl cyanoacrylate, 2-ethoxyethyl cyanoacrylate, 2-(1-methoxy)propyl cyanoacrylate, 2-methoxyethyl cyanoacrylate, 2-ethoxyethyl cyanoacrylate, 2-(1-methoxy)propyl cyanoacrylate, 2-(2'-methoxy)-ethoxyethyl-2"-cyanoacrylate, 2-(2'-ethoxy)-ethoxyethyl-2"-cyanoacrylate, 2-(2'-propyloxy)-ethoxyethyl-2"-cyanoacrylate, 2-(2'-butoxy)-ethoxyethyl-2"-cyanoacrylate, 2-(2'-pentyloxy)-ethoxyethyl-2"-cyanoacrylate, 2-(2'-hexyloxy)-ethoxyethyl-2"-cyanoacrylate, 2-(2'-methoxy)-propyloxypropyl-2"-cyanoacrylate, 2-(2'-ethoxy)-propyloxypropyl-2"-cyanoacrylate, 2-(2'-propyloxy)-propyloxypropyl-2"-cyanoacrylate, 2-(2'-butyloxy)-propyloxypropyl-2"-cyanoacrylate, 2-(2'-pentyloxy)-propyloxypropyl-2"-cyanoacrylate, 2-(2'-hexyloxy)-propyloxypropyl-2"-cyanoacrylate, 2-(2'-methoxy)-butyloxybutyl-2"-cyanoacrylate, 2-(2'-ethoxy)-butyloxybutyl-2"-cyanoacrylate, 2-(2'-butyloxy)-butyloxybutyl-2"-cyanoacrylate, 2-(3'-methoxy)-propyloxyethyl-2"-cyanoacrylate, 2-(3'-methoxy)-butyloxyethyl-2"-cyanoacrylate, 2-(3'-methoxy)-propyloxypropyl-2"-cyanoacrylate, 2-(3'-methoxy)-butyloxypropyl-2"-cyanoacrylate, 2-(2'-methoxy)-ethoxypropyl-2"-cyanoacrylate, 2-(2'-methoxy)-ethoxybutyl-2"-cyanoacrylate, n-propyl cyanoacrylate, ethyl-2-cyanoacrylate, iso-propyl cyanoacrylate, n-butyl cyanoacrylate, sec-butyl cyanoacrylate, iso-butyl cyanoacrylate, tert-butyl cyanoacrylate, n-pentyl cyanoacrylate, 1-methylbutyl cyanoacrylate, 1-ethylpropyl cyanoacrylate, neopentyl cyanoacrylate, n-hexyl cyanoacrylate, 1-methylpentyl cyanoacrylate, n-heptyl cyanoacrylate, n-octyl cyanoacrylate, n-nonyl cyanoacrylate, n-decyl cyanoacrylate, n-undecyl cyanoacrylate, n-dodecyl cyanoacrylate, cyclohexyl cyanoacrylate, and mixtures thereof.

Combinations of one or more such cyanoacrylates may be used.

In a preferred embodiment, at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group.

Preferably, X is a linear alkylene comprising from 2 to 5 carbon atoms, more preferably two carbon atoms, and $R^b$ is an alkyl group comprising from 1 to 6 carbon atoms, preferably one or two carbon atoms.

Preferably, the cyanoacrylate monomer is chosen from the group consisting of ethyl-2-cyanoacrylate, 2-methoxyethyl cyanoacrylate, and mixtures thereof.

Such monomers of formula (I) can be prepared by methods known by the skilled in the art as, for example, as in the method described in the U.S. Pat. No. 2,467,927.

Some of them, such as ethyl-2-cyanoacrylate (ECA) and 2-methoxyethyl cyanoacrylate (MECA) are commercially available.

In the first part of the composition of the invention, the total content of cyanoacrylate monomer(s) may be higher than 60% by weight, preferably higher or equal to 70% by weight, and more particularly higher or equal to 85% by weight based on the total weight of the first part.

In one embodiment, in the first part of the composition of the invention, the total content of cyanoacrylate monomer(s) ranges from 60% to 99% by weight, preferably from 70% to 98% by weight, and more preferably from 85% to 95% by weight based on the total weight of the first part of the composition.

Preferably, the first part of the composition comprises at least 20% by weight of at least one cyanoacrylate monomer comprising a group —X—O—$R^b$ as defined above, based on the total weight of the first part of the composition, more preferably at least 30% by weight, and even more preferably at least 50% by weight based on the total weight of the first part.

Transition Metal Complex

Typically, the transition metal complexes include transition metal salts.

The preferred group of transition metal complexes are those of copper. The transition metal in the transition metal complex is preferably copper.

Particularly preferred transition metal complexes are those of copper, for example copper (II) or copper (I) complexes.

A non-exhaustive list of copper (I) and copper (II) complexes includes:
copper (I) and copper (II) salts such as for example copper (II) trifluoromethanesulfonate, copper (II) hexafluorophosphate, copper (II) tetrafluoroborate (including for example its hexahydrate $Cu(BF_4)_2 \cdot (6H_2O)$), copper salts (I) of formula $Cu(R''—CN)_y X'$ wherein R'' is alkyl such as Me, Et, Pr, or vinyl or acryl, y ranges from 2 to 4 and X' is a soft counteranion (for example tetrafluoroborate or hexafluorophosphate);
copper (I) trifluoromethanesulfonate toluene complexes, copper (I) trifluoromethanesulfonate benzene complexes.

Preferably, transition metal complexes are selected from copper (II) tetrafluoroborate and copper (I) tetrakis (acetonitrile) tetrafluoroborate, copper (I) trifluoromethanesulfonate, toluene complex and more preferably the copper salt is $Cu(BF_4)_2 \cdot (6H_2O)$.

In the case of using copper (I) salts, it is preferably to include a higher amount of an acid stabilizing agent, such as, for example, boron trifluoride etherate complex.

The total content of transition metal complex(es) in the first part of the composition may range from 0.001% to 1.0% by weight, preferably from 0.005% to 0.1% by weight based on the total weight of the first part of the composition.

Antioxidant

A suitable antioxidant for the first part of the composition can be chosen from the group consisting of: methylenebis (4-methyl-6-tert-butylphenol), hydroxyanisole butyl ether, 4-methyl-2,6-di-tert-butylphenol, hydroquinone monomethyl ether, tert-butylhydroquinone, and mixtures thereof.

The total content of antioxidant(s) in the first part of the composition may range from 0.01% to 1% by weight, preferably from 0.05% to 0.8%, and more preferably from 0.1% to 0.3% by weight based on the total weight of the first part.

Additives

The first part of the composition may further contain at least one additive for example chosen from the group consisting of: a thixotropic agent, a thickening agent, a toughening agent, an accelerating agent, an adhesion promoter, a pigment, a colorant, a stabilizing agent, a plasticizer, and mixtures thereof.

A suitable stabilizing agent may be selected from the group consisting of radical stabilizing agents, acid stabilizing agents, and mixtures thereof.

Radical stabilizing agents are typically radical polymerization inhibitors, and are preferably selected from the group consisting of 4-methoxyphenol, hydroquinone, hydroquinone monomethyl ether, hydroxytoluene butyl ether, hydroxyanisole butyl ether, 4,4'-methylenebis (2,6-di-tert-butylphenol), and mixtures thereof.

The total content of radical stabilizing agent(s), in the first part of the composition, may range from 0.001% to 0.2% by weight, preferably from 0.01% to 0.1%, and more preferably from 0.02% to 0.06% by weight based on the total weight of the first part.

The acid stabilizing agents are typically inhibitors of the anionic polymerization. The acid stabilizing agent may be selected from the group consisting of Bronsted acids, Lewis acids, and mixtures thereof. The acid stabilizing agent is preferably selected from the group consisting of methanesulfonic acid, p-toluenesulfonic acid, hydrofluoric acid, boron trifluoride, boron trifluoride etherate complex, fluoroboric acid, sulphur dioxide, and mixtures thereof.

In a preferred embodiment, the first part of the composition comprises methanesulphonic acid, sulphur dioxide, boron trifluoride etherate complex, hydroquinone and hydroquinone monomethylether and 4,4'-methylenebis(2,6-di-tert-butylphenol).

In the first part of the composition, the total content of stabilizing agent(s) generally ranges from 0.0001% by weight to 1% by weight, preferably from 0.001% to 0.8%, and more preferably from 0.0015% to 0.7% by weight based on the total weight of the first part.

Typically, an adhesion promoter may be chosen from the group of aromatic carboxylic acid or anhydride, and preferably from the group consisting of trimellitic acid, trimellitic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid, and mixtures thereof.

The total content of adhesion promoter(s) in the first part of the composition may range from 0.02% to 0.1% by weight, more preferably from 0.03% to 0.08% by weight based on the total weight of the first part.

A suitable accelerating agent (or accelerator) may be selected from calixarenes, crown ethers (for example, 15 Crown 5, 18 Crown 6, Dibenzo 18 Crown 6, commercialized by Alfa Aesar), cyclodextrins, and mixtures thereof.

Typically, the total content of accelerator(s) in the first part of the composition ranges from 0.01% to 0.8% by weight, preferably from 0.05% to 0.5%, and more preferably from 0.1% to 0.3% by weight based on the total weight of the first part.

A suitable thixotropic agent may be selected from the group consisting of hydrogenated castor oil optionally modified by reaction with an amine, polyamides, silica, and mixtures thereof.

Preferably, the thixotropic agent is silica, more preferably selected from the group consisting of fumed silica, hydrophobic fumed silica (for example Aerosil® R202 commercialized by Evonik), hydrophilic fumed silica and precipitated silica.

Typically, the total content of thixotropic agent(s) in the first part of the composition ranges from 2% to 10% by weight, preferably from 3% to 8%, and more preferably from 4% to 7% by weight based on the total weight of the first part.

A suitable thickener or thickening agent for the first part of the composition can be selected from those which are compatible with the monomers that it contains. Among them can be mentioned poly(meth)acrylates, acylated cellulose polymers, for example cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate, copolymers of lactic acid and caprolactone, and mixtures thereof.

These thickening agents are well known to the skilled in the art and have been described in the prior art. Preferably, in the adhesive of the invention the thickener is selected from the group consisting of poly(meth)acrylates, polymethyl(meth)acrylate, polyvinylpyrrolidones, polyvinyl acetates, partially hydrolysed polyvinyl acetates, vinyl acetate copolymers, and acylated cellulose polymers. A suitable thickener for first part of the composition can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof. Polycyanoacrylates themselves may be added to cyanoacrylate compositions to confer a degree of thickening.

Typically, the total content of thickener(s) in the first part of the composition ranges from 2% to 10% by weight, preferably from 3% to 8%, and more preferably from 4% to 7% by weight based on the total weight of the first part of the composition.

Suitable tougheners or toughening agents for the first part of the composition are block copolymers (Polymethylmethacrylate-co-Polybutylacrylate-co-Polymethylmethacrylate for example); elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof.

The first part does not comprise a per-compound. A per-compound is a compound that contains the group O—O in the structure, such as for example a perester, perborate, persulfate, peracetal, or peroxide.

In a preferred embodiment, the first part of the composition comprises a thickener and a thixotropic agent, and preferably it further comprises an adhesion promoter, and at least one stabilizing agent.

Component B

Michael Acceptors M

The second part of the composition comprises at least one Michael acceptor M selected from the group consisting of (meth)acrylic monomers, (meth)acrylic functionalized oligomers, (meth)acrylic functionalized resins, and mixtures thereof.

Michael reactions are well known in the art and involve the addition of a Michael donor to a Michael acceptor. Examples of such reactions are disclosed in U.S. Pat. Nos. 5,350,875, 5,430,177, 6,706,414, WO 2005/012394 and EP 0 970 137. A Michael donor is a compound with at least one Michael donor functional group, which is a functional group containing at least one Michael active hydrogen atom which is a hydrogen atom attached to a carbon atom that is located between two electron-withdrawing groups such as for example C=O, CN. Examples of Michael donor functional groups are acetoacetate ester, cyanoacetates, chain ends of polycyanoacrylates, and malonamides. Once the hydrogen atom removed from the Michael donor, it may then react with Michael acceptors such as acrylic compounds.

The Michael acceptor M may be monofunctional or polyfunctional (such as di- or tri-functional).

The Michael acceptor M may comprise at least one (meth)acrylic function.

The (meth)acrylic monomers may be chosen from the group consisting of:

i) a compound of general formula (III)

$$CH_2=CR_3(CO_2R_4) \qquad (III)$$

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or a isobornyl group (Ra being preferably a $C_2$-$C_6$ linear or branched alkoxyalkyl);

ii) a compound having one of the formulae (IV) to (VI):

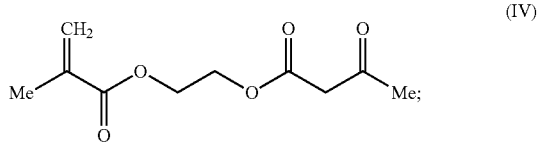

(IV)

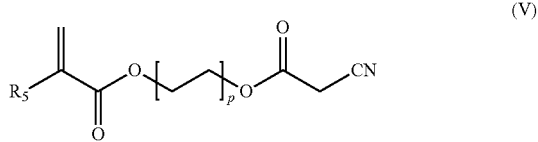

(V)

wherein $R_5$ is H or Me, and p is an integer ranging from 1 to 6;

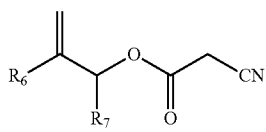

(VI)

wherein $R_6$ is $CO_2R_4$, where $R_7$ is H or Me;

iii) a compound selected from the group consisting of: butanediol di(meth)acrylate, hexanediol di(meth)acrylate, diethylene glycol di(meth)acrylate, triethyleneglycol di(meth)acrylate, polyethylene glycol di(meth)acrylate, trimethylolpropane tri(meth)acrylate (TMPTA), ethoxylated trimethylolpropane tri(meth) acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; and iv) mixtures thereof.

Examples of (meth)acrylic monomers are readily available from well-known suppliers such as, for example, Sartomer, Arkema, and BASF.

Polyfunctional (meth)acrylic esters may be of relatively low molecular weight such as the commercially available, triethylene oxide dimethacrylate, or butanediol dimethacrylate, or may be of higher molecular weight: (meth)acrylic functionalized oligomers and (meth)acrylic functionalized resins, for example (meth)acrylic ester terminated polymers, such as (meth)acrylic terminated urethane polymers or copolymers or so-called (meth)acrylic ester functionalised telechelic, dendrimeric or hyperbranched materials. (Meth) acrylic functionalised polymers may inherently possess high viscosity and also serve as thickeners for the formulation.

In a preferred embodiment, the Michael acceptor is chosen from the (meth)acrylic monomers, and more preferably from the group consisting of:

i) a compound of general formula (III)

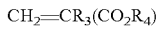

$$CH_2=CR_3(CO_2R_4) \quad (III)$$

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or an isobornyl group;

ii) a compound having one of the formulae (IV) to (VI):

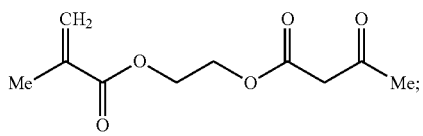

(IV)

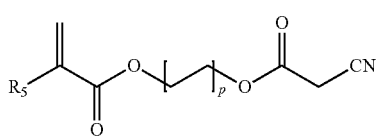

(V)

wherein $R_5$ is H or Me, and p is an integer ranging from 1 to 6;

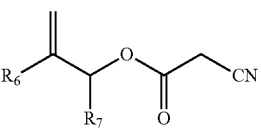

(VI)

wherein $R_6$ is $CO_2R_4$, where $R_7$ is H or Me.

The compound of formula (III) is preferably ethoxyethyl acrylate or methacrylate.

The compound of formula (V) is preferably a compound wherein $R_5$=Me and p=6.

In a preferred embodiment, the second part of the composition comprises more than 30% by weight of Michael acceptor M, more preferably more or equal to 50% by weight, even more preferably higher or equal to 70% by weight, in particular higher or equal to 90% by weight based on the total weight of the second part.

The Michael acceptor M can comprise a radical -$EWG_1$-$CH_2$-$EWG_2$- wherein $EWG_2$ and $EWG_1$ are independently of each other an electron withdrawing group. In that case, the Michael acceptor M comprises both Michael acceptor functional group (acrylic moiety) and Michael donor functional group (-$EWG_1$-$CH_2$-$EWG_2$).

In one embodiment, the second part of the composition comprises a Michael acceptor M comprising a radical -$EWG_1$-$CH_2$-$EWG_2$- wherein $EWG_2$ and $EWG_1$ are independently of each other an electron withdrawing group. The second part of the composition thus comprises a compound C comprising a radical -$EWG_1$-$CH_2$-$EWG_2$- wherein $EWG_2$ and $EWG_1$ are independently of each other an electron withdrawing group (the compound C being the Michael acceptor M in this case).

According to this embodiment, the two-part curable composition comprises:
a first part (component A) comprising:
at least 51% by weight based on the total weight of the first part, of one or more cyanoacrylate monomer(s);
a transition metal complex; and
an antioxidant;
a second part (component B) comprising:
a per-compound;
at least one Michael acceptor M selected from the group consisting of (meth)acrylic monomers, (meth) acrylic functionalized oligomers, (meth)acrylic functionalized resins, and mixtures thereof;
optionally an acid scavenger AS compound selected from the sterically hindered bases;
the Michael acceptor M comprising a radical -$EWG_1$-$CH_2$-$EWG_2$- wherein $EWG_2$ and $EWG_1$ are independently of each other an electron withdrawing group provided that:
the composition comprises in the second part at least one compound C comprising a radical -$EWG_1$-$CH_2$-$EWG_2$- wherein $EWG_2$ and $EWG_1$ are independently of each other an electron withdrawing group;
the first part of the composition does not comprise per-compound;
the compound C being the Michael acceptor M mentioned above (comprising a radical $EWG_1$-$CH_2$-$EWG_2$- wherein $EWG_2$ and $EWG_1$ are independently of each other an electron withdrawing group).

The Michael acceptor M comprising a radical -$EWG_1$-$CH_2$-$EWG_2$ may be chosen from the compounds having one of the formulae (IV) to (VI):

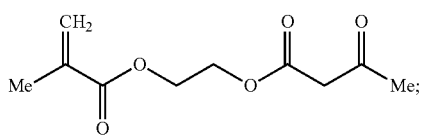

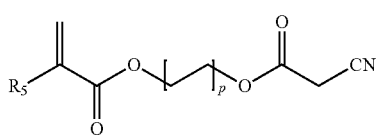

wherein $R_5$ is H or Me, and p is an integer ranging from 1 to 6;

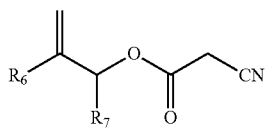

wherein $R_6$ is $CO_2R_4$, where $R_7$ is H or Me;
and more preferably the compound of formula (IV).

In one embodiment, when the second part of the composition comprises a Michael acceptor comprising a radical -$EWG_1$-$CH_2$-$EWG_2$- wherein $EWG_2$ and $EWG_1$ are independently of each other an electron withdrawing group, then the composition does not comprise additional compound C comprising said radical -$EWG_1$-$CH_2$-$EWG_2$-.

Per-Compound

A per-compound is a compound that contains the group O—O in the structure, such as for example a perester, perborate, persulfate, peracetal, or peroxide, preferably a perester.

Suitable per-compounds are, for example, tert-butyl perbenzoate (TBPB) or tert-butyl peroxide (TBP).

The total content of per-compound in the second part may range from 0.1% to 20% by weight, preferably from 0.15% to 10% by weight, and more preferably from 0.2% to 5% by weight based on the total weight of the second part of the composition.

Additives

The second part of the composition may further contain at least one additive for example chosen from the group consisting of: a thixotropic agent, a thickening agent, a toughening agent, an accelerating agent, an adhesion promoter, a pigment, a colorant, a stabilizing agent, a plasticizer, and mixtures thereof.

A suitable stabilizing agent may be selected from the group consisting of radical stabilizing agents, acid stabilizing agents, and mixtures thereof.

Radical stabilizing agents are typically radical polymerization inhibitors, and are preferably selected from the group consisting of 4-methoxyphenol, hydroquinone, hydroquinone monomethyl ether, hydroxytoluene butyl ether, hydroxyanisole butyl ether, 4,4'-methylenbis (2,6-di-tert-butylphenol), and mixtures thereof.

The total content of radical stabilizing agent(s), in the second part of the composition, may range from 0% to 0.2% by weight, preferably from 0.01% to 0.1%, and more preferably from 0.02% to 0.06% by weight based on the total weight of the second part.

The acid stabilizing agents are typically inhibitors of the anionic polymerization. The acid stabilizing agent may be selected from the group consisting of Bronsted acids, Lewis acids, and mixtures thereof. The acid stabilizing agent is preferably selected from the group consisting of methanesulfonic acid, p-toluenesulfonic acid, hydrofluoric acid, boron trifluoride, boron trifluoride etherate complex, fluoroboric acid, sulphur dioxide, and mixtures thereof.

In the second part of the composition, the total content of stabilizing agent(s) generally ranges from 0% by weight to 1% by weight, preferably from 0.001% to 0.8%, and more preferably from 0.0015% to 0.7% by weight based on the total weight of the second part.

Typically, an adhesion promoter may be chosen from the group of aromatic carboxylic acid or anhydride, and preferably from the group consisting of trimellitic acid, trimellitic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid, and mixtures thereof.

The total content of adhesion promoter(s) in the second part of the composition may range from 0% to 0.1% by weight, more preferably from 0.03% to 0.08% by weight based on the total weight of the second part.

A suitable accelerating agent (or accelerator) may be selected from calixarenes, crown ethers (for example, 15 Crown 5, 18 Crown 6, Dibenzo 18 Crown 6, commercialized by Alfa Aesar), cyclodextrins, and mixtures thereof.

Typically, the content of the accelerator in the second part of the composition ranges from 0% to 0.8% by weight, preferably from 0.01% to 0.5%, and more preferably from 0.1% to 0.3% by weight based on the total weight of the second part.

A suitable thixotropic agent may be selected from the group consisting of hydrogenated castor oil optionally modified by reaction with an amine, polyamides, silica, and mixtures thereof.

Preferably, the thixotropic agent is silica, more preferably selected from the group consisting of fumed silica, hydrophobic fumed silica (for example Aerosil® R202 commercialized by Evonik), hydrophilic fumed silica and precipitated silica.

Typically, the content of the thixotropic agent in the second part of the composition ranges from 2% to 10% by weight, preferably from 3% to 8%, and more preferably from 4% to 7% by weight based on the total weight of the second part.

A suitable thickener or thickening agent for the second part of the composition can be selected from those which are compatible with the monomers that it contains. Among them can be mentioned poly(meth)acrylates, acylated cellulose polymers, for example cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycol-terephthalate, copolymers of lactic acid and caprolactone, and mixtures thereof.

These thickening agents are well known to the skilled in the art and have been described in the prior art. Preferably, in the composition of the invention the thickener is selected from the group consisting of poly(meth)acrylates, polyvinylpyrrolidones, polyvinyl acetates, partially hydrolysed polyvinyl acetates, vinyl acetate copolymers, and acylated cellulose polymers. A suitable thickener for first part of the composition can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof. Polycyanoacrylates themselves may be added to cyanoacrylate compositions to confer a degree of thickening. Polymers suitable as thickeners generally do not confer toughness.

Typically, the content of thickener in the second part of the composition ranges from 0% to 10% by weight, preferably from 3% to 8%, and more preferably from 4% to 7% by weight based on the total weight of the second part of the composition.

Suitable tougheners or toughening agents for the first part of the composition are block copolymers (Polymethylmethacrylate-co-Polybutylacrylate-co-Polymethylmethacrylate for example); elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof. Polymers suitable as toughener may also function as thickeners.

Preferably, the second part of the composition does not comprise a transition metal complex (such as for example $Cu(BF_4)_2 \cdot H_2O$).

Acid Scavenger

Acid scavengers may optionally be present in the second part of the composition.

Acid scavengers AS are chosen from the group of sterically hindered bases.

In one embodiment, the acid scavenger is chosen from the group of dialkyl substituted pyridine and substituted aniline.

Preferably, the acid scavenger AS is chosen from the group consisting of 2,6-di-tertiary butyl pyridine, N,N' dimethyl aniline, ethyl-4-(dimethylamino) benzoate and mixtures thereof.

The preferred concentration range for such additives if present ranges from 0.01 to 0.05% by weight and more preferably from 0.01 to 0.03% by weight based on the total weight of the second part.

Preferably, the second part comprises an acid scavenger.

Composition

The two-part composition may be dispensed from packages (such as two-part syringes) or from reservoir pots. The former are generally convenient for manual application and the volume ratio first part:second part may range from 1:1 to 10:1, more preferably 2:1, or 4:1.

Two-part compositions may also be dispensed using automated equipment and mixing ratios may be continuously adjustable form 1:1 to 10:1.

In the two-part composition, the volume ratio first part: second part may range from 1:1 to 10:1, preferably from 2:1 to 5:1, and even more preferably 2:1, 3:1, 4:1 or 5:1.

The composition comprises (in the first part and/or in the second part) at least one compound C comprising a radical -EWG$_1$-CH$_2$-EWG$_2$- wherein EWG$_2$ and EWG$_1$ are independently of each other an electron withdrawing group.

The two electron-withdrawing groups are preferably chosen in the group consisting of nitrile (CN), carbonyl (COR'), ester (CO$_2$R'), nitro (NO$_2$), halogens (F, Cl), trifluoromethyl (CF$_3$), sulfonyl (SO$_3$R'), wherein R' is an alkyl group.

Compound C is typically a Michael donor wherein -EWG$_1$-CH$_2$-EWG$_2$- radical is a Michael donor functional group.

Preferably, the compound C comprising a radical -EWG$_1$-CH$_2$-EWG$_2$- is chosen from the group consisting of:
a compound having one of the formulae (IV) to (VI):

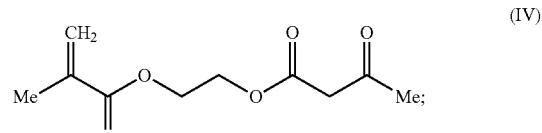

(IV)

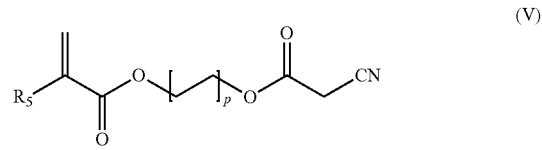

(V)

wherein $R_5$ is H or Me, and p is an integer ranging from 1 to 6;

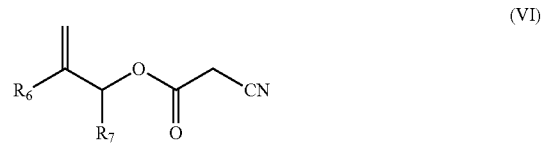

(VI)

wherein $R_6$ is $CO_2R_4$, $R_4$ being as defined above, and $R_7$ is H or Me.

homopolymers of the compounds of formulae (IV) to (VI);

copolymers resulting from the polymerisation of at least one compound of formulae (IV) to (VI) above with other (meth)acrylic monomer(s).

The compounds of formulae (IV) to (VI) typically comprise both Michael acceptor functional group (acrylic moiety) and Michael donor functional group (-EWG$_1$-CH$_2$-EWG$_2$-).

Preferably, when the Michael acceptor in the second part of the composition does not comprise a radical -EWG$_1$-CH$_2$-EWG$_2$-, then the first part of the composition comprises a compound C comprising a radical -EWG$_1$-CH$_2$-EWG$_2$- as defined above.

Compounds according to structures (V) and (VI) may be prepared, for example, as disclosed in U.S. Pat. No. 8,481,755.

The polymers mentioned above may comprise the following unit of formula (VII):

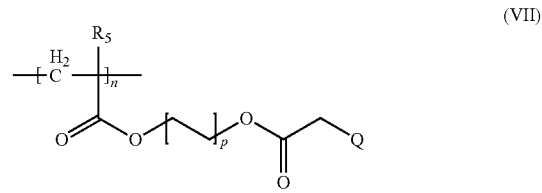

(VII)

wherein $R_5$ and p are defined as above, n typically ranges from 50 to 4000, and Q=—CN or —COMe. It may be obtained from compounds of formula (V) as defined above.

Homo- or copolymers containing the unit of formula (VII) may be prepared by standard methods of polymer chemistry such as, for instance, radical polymerization using AIBN as initiator. Compound of formula (IV) above may also be polymerised in a similar manner.

In one embodiment, the present invention concerns a two-part curable composition comprising:
a first part (component A) comprising:
  at least 51% by weight based on the total weight of the first part, of one or more cyanoacrylate monomer(s);
  a transition metal complex; and
  an antioxidant;
  at least one compound C comprising a radical -$EWG_1$-$CH_2$-$EWG_2$- wherein $EWG_2$ and $EWG_1$ are independently of each other an electron withdrawing group;
a second part (component B) comprising:
  a per-compound;
  at least one Michael acceptor M selected from the group consisting of (meth)acrylic monomers, (meth)acrylic functionalized oligomers, (meth)acrylic functionalized resins, and mixtures thereof;
  optionally an acid scavenger AS compound selected from the sterically hindered bases;
  provided that the first part of the composition does not comprise per-compound.

In one other embodiment, the present invention concerns a two-part curable composition comprising:
a first part (component A) comprising:
  at least 51% by weight based on the total weight of the first part, of one or more cyanoacrylate monomer(s);
  a transition metal complex; and
  an antioxidant;
a second part (component B) comprising:
  a per-compound;
  at least one Michael acceptor M selected from the group consisting of (meth)acrylic monomers, (meth)acrylic functionalized oligomers, (meth)acrylic functionalized resins, and mixtures thereof, said Michael acceptor M comprising a radical -$EWG_1$-$CH_2$-$EWG_2$- wherein $EWG_2$ and $EWG_1$ are independently of each other an electron withdrawing group, said Michael acceptor M being a compound C as defined above;
  optionally an acid scavenger AS compound selected from the sterically hindered bases;
  provided that the first part of the composition does not comprise per-compound, and preferably the first part of the composition does not comprise a compound C as defined above.

Preferred two-part curable compositions are chosen among the following compositions:
1) Two-part curable composition comprising:
  a first part (component A) comprising:
    at least 70% by weight based on the total weight of the first part, of one or more cyanoacrylate monomer(s);
    from 0% to 5% of thixotropic agent;
    from 0% to 5% of a thickening agent;
    from 0.001% to 0.2% of stabilizing agent(s);
    from 0.01% to 1% by weight of antioxidant(s);
    from 0.001% to 1% by weight of transition metal complex(s);
  a second part (component B) comprising:
    at least 40% by weight of at least one Michael acceptor M selected from the group consisting of (meth)acrylic monomers, (meth)acrylic functionalized oligomers, (meth)acrylic functionalized resins, and mixtures thereof,
    from 0.1% to 20% by weight of per compound(s) based on the total weight of the second part;
    from 0% to 5% of thixotropic agent(s);
    from 0% to 0.05% of an acid scavenger compound AS selected from sterically hindered bases;
  the Michael acceptor comprising a radical -$EWG_1$-$CH_2$-$EWG_2$- wherein $EWG_2$ and $EWG_1$ are independently of each other an electron withdrawing group,
  the first part being deprived of per-compound;
2) Two-part curable composition comprising:
  a first part (component A) comprising:
    at least 70% by weight based on the total weight of the first part, of one or more cyanoacrylate monomer(s);
    from 0% to 5% of thixotropic agent;
    from 0% to 5% of a thickening agent;
    from 0.001% to 0.2% of stabilizing agent(s);
    from 0.01% to 1% by weight of antioxidant(s);
    from 0.001% to 1% by weight of transition metal complexe(s);
    from 1% to 30% by weight of a compound C comprising a radical -$EWG_1$-$CH_2$-$EWG_2$- wherein $EWG_2$ and $EWG_1$ are independently of each other an electron withdrawing group;
  the first part being deprived of per-compound;
  a second part (component B) comprising:
    at least 40% by weight of at least one Michael acceptor M selected from the group consisting of (meth)acrylic monomers, (meth)acrylic functionalized oligomers, (meth)acrylic functionalized resins, and mixtures thereof,
    from 0.1% to 20% by weight of per compound(s) based on the total weight of the second part;
    from 0% to 5% of thixotropic agent(s)
    from 0% to 0.05% of an acid scavenger compound AS selected from sterically hindered bases.

Syringe or Cartridge or Dispense Head

The present invention also concerns a syringe or a cartridge or dispense head comprising the two-part curable composition defined above.

Preferably, the syringe (or the cartridge) is a syringe (respectively a cartridge) with two chambers each of different volume, one for the first part of the composition and another one for the second part of the composition as defined above.

The first part of the composition is preferably placed in the chamber of larger volume.

The preparation of the adhesive is preferably made by the mixture of the two parts of the composition by hand pressure, or assisted by a gun, on the plungers of the syringe or the cartridge, which forces the content of the chambers to enter into the static mixer and, thus, at its outlet the adhesive of the invention is obtained. In the adhesive, the two components are advantageously intimately mixed.

For automated dispense preparation of the adhesive is preferably made by the mixture of the two parts of the composition by forcing the them together into a valve and mixing element that constitutes a dispense head, so specific quantities of mixture of the desired composition can be dispensed onto parts.

Use of the Composition

The present invention also concerns the use of the two-part curable composition as defined above for bonding substrates.

The present invention also concerns a method for bonding substrates comprising the steps of:
- applying a two-part curable composition as defined above to at least one of the substrates,
- mating together the substrates for a time sufficient to permit an adhesive bond to form between the mated substrates;
- optionally heating the mated (and optionally clamped) substrates, in particular to a temperature higher than 100° C., more preferably higher than 120° C.

The heating step may be carried out for a time sufficient to reach the desired properties, preferably for a time ranging from 1 minute to 5 days.

The two-part adhesive composition of the invention advantageously exhibits at least one of the following properties:
- Fast fixturing: preferably lower than 10 min, more preferably lower than 6 min on mild steel;
- Long on part open time: preferably greater than 30 minutes at room temperature (25° C.);
- High bond strengths: preferably at least 7 MPa on mild steel and more preferably greater than 10 MPa on mild steel in tensile shear.
- A high degree of CTV; preferably retention of at least 60% of zero gap tensile strength at 2 mm gap spacing on mild steel and more preferably greater than 80% retention.
- High resistance to thermal ageing; preferably retention of at least 30% of initial bond strength on mild steel when exposed to temperatures of 150 C for 3 days and tested at ambient temperature and more preferably retention of 65%.
- High resistance to submersion in hot water preferably retention of at least 30% of initial bond strength on mild steel when exposed to temperatures of 60 C for 3 days and tested at ambient temperature and more preferably retention of 50%.
- Good resistance to organic solvents (preferably between 50 and 100% of insolubility of adhesive cured at room temperature in acetone for 24 h).

EXAMPLES

All the following ingredients were used:
Ethyl cyanoacrylate (ECA): Cartell Chemical Co Ltd
Methoxyethyl cyanoacrylate (MECA): Cartell Chemical Co. Ltd
Compound having the formula (IV) above: acetoacetoxyethyl methacrylate Eastman® AAEM commercialised by Eastman Chemical Co
Kurarity LA2410: acrylic block copolymer commercialized by Kuraray
Compound having the formula (V) as defined above wherein p=6, $R_5$=Me (prepared as disclosed in U.S. Pat. No. 8,481,755)
$SO_2$: Carburos Metalicos SA
Degacryl 449: Polymethylmethacrylate commercialized by Evonik
Aerosil R202: Hydrophobic fumed silica commercialized by Evonik All of the following were obtained from Sigma Aldrich Merck:
Methane sulphonic acid, $BF_3$·etherate, Hydroquinone, Hydroquinone monomethylether, 4,4'-methylenebis(2,6-di-tert-butylphenol), Itaconic acid, tert-butyl perbenzoate, 2,6-ditertbutyl pyridine, ethyl4-(dimethylamino) benzoate, ethoxyethyl methacrylate.

The Following Methods were Used to Assess the Performance of the Compositions:

Tensile shear test data reflect bond strength measured in Mega Pascals (MPa) after assembling overlapping lapshear (standard test pieces) parts with a contact area of 25 mm$^2$; measured according to ASTM D1002 bonded lapshears rested for 24 h after assembly before testing. Testing for resistance is also measured on assembled lapshear specimens after exposing to dry heat of 150° C. for 3 days, and also for assembled samples exposed to submersion in hot water (at 60° C.) for 3 days.

Gap bonding (GB) were measured by the tensile shear strength of bonded mild steel substrates (MS) lapshears when the gap between the two parts is set at 2 mm thickness by a small spacing wire of 2 mm diameter bent in a horseshoe shape. Strengths were measured after 24 hr resting after assembly.

Example 1: Preparation of a Homopolymer

A homopolymer of structure (VII) as defined above wherein $R_5$ is Me, p is 1, and Q is —CN was prepared by polymerising a monomer of structure (V) which was polymerised in ethyl acetate solution using AIBN initiator (1 mol %) by heating at 75° C. (reflux) for 3 h under nitrogen atmosphere. The polymer was precipitated as a white solid using nonsolvent methanol. The polymer was filtered and dried to constant weight for 6 h at 25° C. (40 mbar vacuum).

Example 2: Two-Part Curable Compositions

The first and second part of the compositions of example 2 indicated in Table 1 were prepared:

TABLE 1

| Composition | Component | Composition no1 % (w/w) or ppm | Composition no2 | Composition no3 |
|---|---|---|---|---|
| First part | Ethyl cyanoacrylate (ECA) | — | — | 44.853 |
| | Methoxyethyl cyanoacrylate (MECA) | 88.4561 | 70.7649 | 44.853 |
| | Compound of formula (V) (p = 6, $R_5$ = Me) | — | 17.6912 | — |
| | Polymer of example 1 | — | — | 5 |
| | $SO_2$ | 50 ppm | 50 ppm | 50 ppm |
| | Kurarity LA2410 | 6.25 | 6.25 | — |
| | Hydrophobic fumed silica | 5 | 5 | 5 |
| | Itaconic acid | 0.0389 | 0.0389 | 0.039 |
| | $Cu(BF_4)_2$·$(6H_2O)$ | 0.05 | 0.05 | 0.05 |

TABLE 1-continued

| Composition | Component | Composition no1 % (w/w) or ppm | Composition no2 | Composition no3 |
|---|---|---|---|---|
| Second part | methylenebis(4-methyl-6-tert-butylphenol), | 0.2000 | 0.2000 | 0.2000 |
| | acetoacetoxyethyl methacrylate Eastman ® AAEM | 84.95 | — | |
| | Ethoxyethyl methacrylate | — | 84.95 | 84.95 |
| | tert-butyl perbenzoate | 10 | 10 | 10 |
| | Hydrophobic fumed silica | 5.05 | 5.05 | 5.05 |

The first and the second part of Table 1 were mixed in a 4:1 ratio in volume.

The two parts were loaded into a 4:1 syringe fitted with a 4:1 static mixer. The first part was the part of largest volume.

Those compositions showed thermal resistance after continuous exposure to 150° C. for 3 days. Thermal resistance was assessed relative to initial strengths on mild steel (MS) lapshears set without gap spacing (zero gap). Table 2 shows the results:

TABLE 2

| Example | Tensile shear Zero gap MS (MPa) | Tensile shear Zero gap MS after 3 days at 150° C. (MPa) |
|---|---|---|
| Composition no1 | 7 | 7 |
| Composition no2 | 7 | 12 |
| Composition no3 | 13 | 9 |

The invention claimed is:

1. A two-part curable composition comprising:
   a first part (component A) comprising:
      at least 51% by weight, based on the total weight of the first part, of one or more cyanoacrylate monomer(s);
      a transition metal complex; and
      an antioxidant; and
   a second part (component B) comprising:
      a per-compound;
      at least one Michael acceptor M selected from the group consisting of (meth)acrylic monomers, (meth)acrylic functionalized oligomers, (meth)acrylic functionalized resins, and mixtures thereof;
      optionally an acid scavenger AS compound selected from the group consisting of the sterically hindered bases;
   wherein:
      the composition comprises (in the first part and/or in the second part) at least one compound C comprising a radical -$EWG_1$-$CH_2$-$EWG_2$- wherein $EWG_2$ and $EWG_1$ are each, independently of each other, an electron withdrawing group; and
      the first part of the composition does not comprise a per-compound.

2. The two-part curable composition according to claim 1, wherein the cyanoacrylate monomer has the general formula (I):

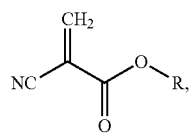

wherein R is selected from the group consisting of $C_1$-$C_{18}$ linear or branched alkyl, $C_3$-$C_{20}$ alkoxyalkyl, trimethylsilylated $C_1$-$C_3$ alkyl, furfuryl, allyl, cyclohexyl, and a group having the following formula: —$R^i$—O—C(O)—C($R^j$)=$CH_2$ with $R^i$ being an organic moiety, and $R^j$ being H or $CH_3$.

3. The two-part curable composition according to claim 2, wherein cyanoacrylate monomer has the formula (I) wherein R has the general formula (II):

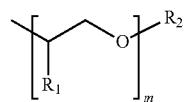

wherein $R_1$=$CH_3$ or H, $R_2$=$C_1$-$C_4$ linear or branched alkyl, and m ranges from 1 to 3.

4. The two-part curable composition according to claim 1, wherein the total content of cyanoacrylate monomer(s) in the first part is higher than 60% by weight, based on the total weight of the first part.

5. The two-part curable composition according to claim 1, wherein the first part of the composition comprises at least 20% by weight of at least one cyanoacrylate monomer comprising a group —X—O—$R^b$ wherein X is a linear or branched alkylene radical optionally interrupted with one or several oxygen atom(s), and $R^b$ is an alkyl group, based on the total weight of the first part of the composition.

6. The two-part curable composition according to claim 1, wherein the transition metal in the transition metal complex is copper.

7. The two-part curable composition according to claim 1, wherein the transition metal complex is selected from copper (II) tetrafluoroborate and copper (I) tetrakis (acetonitrile) tetrafluoroborate.

8. The two-part curable composition according to claim 1, wherein the antioxidant is selected from the group consisting of: methylenebis(4-methyl-6-tert-butylphenol), hydroxyanisole butyl ether, 4-methyl-2,6-di-tert-butylphenol, hydroquinone monomethyl ether, tert-butylhydroquinone, and mixtures thereof.

9. The two-part curable composition according to claim 1, wherein the (meth)acrylic monomer is chosen from the group consisting of:
i) a compound of general formula (III):

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or a isobornyl group;
ii) a compound having one of the formulae (IV) to (VI):

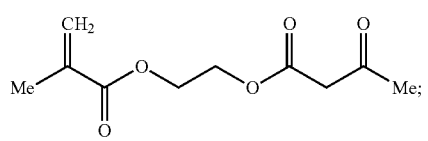

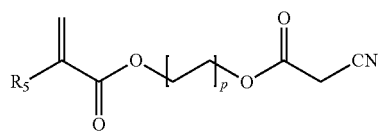

wherein $R_5$ is H or Me, and p is an integer ranging from 1 to 6; or

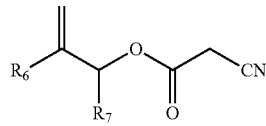

wherein $R_6$ is $CO_2R_4$, where $R_7$ is H or Me;
iii) a compound selected from the group consisting of: butanediol di(meth)acrylate, hexanediol di(meth)acrylate, diethylene glycol di(meth)acrylate, triethyleneglycol di(meth)acrylate, polyethylene glycol di(meth)acrylate, trimethylolpropane tri(meth)acrylate, ethoxylated trimethylolpropane tri(meth)acrylate, neopentylglycol diacrylate, pentaerythritol tetraacrylate, pentaerythritol tetramethacrylate, dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; and
iv) mixtures thereof.

10. The two-part curable composition according to claim 1, wherein the second part of the composition comprises more than 30% by weight of Michael acceptor M, based on the total weight of the second part.

11. The two-part curable composition according to claim 1, wherein the Michael acceptor M is the compound C comprising a radical -$EWG_1$-$CH_2$-$EWG_2$- wherein $EWG_2$ and $EWG_1$ are each, independently of each other, an electron withdrawing group.

12. The two-part curable composition according to claim 1, wherein the per-compound is a perester, perborate, persulfate, peracetal, or peroxide.

13. The two-part curable composition according to claim 1, wherein the first and/or the second part of the composition further contains at least one additive selected from the group consisting of: a thixotropic agent, a thickening agent, a toughening agent, an accelerating agent, an adhesion promoter, a pigment, a colorant, a stabilizing agent, a plasticizer, and mixtures thereof.

14. The two-part curable composition according to claim 1, wherein the volume ratio first part:second part ranges from 1:1 to 10:1.

15. The two-part curable composition according to claim 1, wherein $EWG_2$ and $EWG_1$ are each, independently of each other, an electron withdrawing group selected from the group consisting of nitrile (CN), carbonyl (COR'), ester ($CO_2R'$), nitro ($NO_2$), halogens (F, Cl), trifluoromethyl ($CF_3$), sulfonyl ($SO_3R'$), wherein R' is an alkyl group.

16. The two-part curable composition according to claim 1, wherein the compound C comprising a radical -$EWG_1$-$CH_2$-$EWG_2$- is chosen from the group consisting of:
a compound having one of the formulae (IV) to (VI):

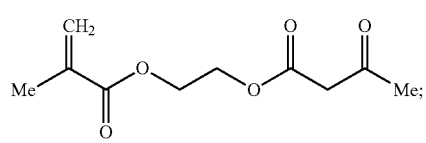

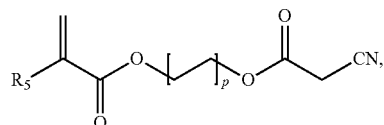

wherein $R_5$ is H or Me, and p is an integer ranging from 1 to 6; or

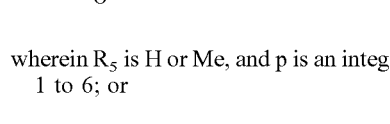

wherein $R_6$ is $CO_2R_4$, $R_4$ is a hydrogen atom, a $C_1$-$C_8$ linear or branched alkyl, a $C_2$-$C_6$ linear or branched alkoxyalkyl, a furfuryl or an isobornyl group, and $R_7$ is H or Me;
homopolymers of the compounds of formulae (IV) to (VI); and
copolymers resulting from the polymerisation of at least one compound of formulae (IV) to (VI) with other (meth)acrylic monomer(s).

17. The two-part curable composition according to claim 1, selected from the following compositions:
1) a two-part curable composition comprising:
a first part (component A) comprising:
at least 70% by weight, based on the total weight of the first part, of one or more cyanoacrylate monomer(s);
from 0% to 5% of thixotropic agent;
from 0% to 5% of a thickening agent;
from 0.001% to 0.2% of stabilizing agent(s);
from 0.01% to 1% by weight of antioxidant(s);
from 0.001% to 1% by weight of transition metal complex(s);
a second part (component B) comprising:
at least 40% by weight of at least one Michael acceptor M selected from the group consisting of (meth)acrylic monomers, (meth)acrylic functionalized oligomers, (meth)acrylic functionalized resins, and mixtures thereof, from 0.1% to 20% by weight of per compound(s) based on the total weight of the second part;

from 0% to 5% of thixotropic agent(s);

from 0%-0.05% of an acid scavenger compound AS selected from sterically hindered bases;

wherein the Michael acceptor comprises a radical -$EWG_1$-$CH_2$-$EWG_2$- wherein $EWG_2$ and $EWG_1$ are each, independently of each other, an electron withdrawing group, and the first part is deprived of a per-compound;

2) a two-part curable composition comprising:

a first part (component A) comprising:

at least 70% by weight, based on the total weight of the first part, of one or more cyanoacrylate monomer(s);

from 0% to 5% of thixotropic agent;

from 0% to 5% of a thickening agent;

from 0.001% to 0.2% of stabilizing agent(s);

from 0.01% to 1% by weight of antioxidant(s);

from 0.001% to 1% by weight of transition metal complex(es); and from 1% to 30% by weight of a compound C comprising a radical -$EWG_1$-$CH_2$-$EWG_2$- wherein $EWG_2$ and $EWG_1$ are each, independently of each other, an electron withdrawing group; and wherein the first part is deprived of a per-compound;

a second part (component B) comprising:

at least 40% by weight of at least one Michael acceptor M selected from the group consisting of (meth)acrylic monomers, (meth)acrylic functionalized oligomers, (meth)acrylic functionalized resins, and mixtures thereof, from 0.1% to 20% by weight of per compound(s) based on the total weight of the second part;

from 0% to 5% of thixotropic agent(s), and from 0% to 0.05% of an acid scavenger compound AS selected from sterically hindered bases.

18. A syringe or cartridge or dispense head comprising the two-part curable composition of claim 1.

19. A method for bonding substrates comprising the steps of:

applying the two-part curable composition of claim 1 to at least one of the substrates, mating together the substrates for a time sufficient to permit an adhesive bond to form between the mated substrates; and optionally heating the mated substrates to a temperature higher than 100° C.

* * * * *